United States Patent Office 3,110,339
Patented Nov. 12, 1963

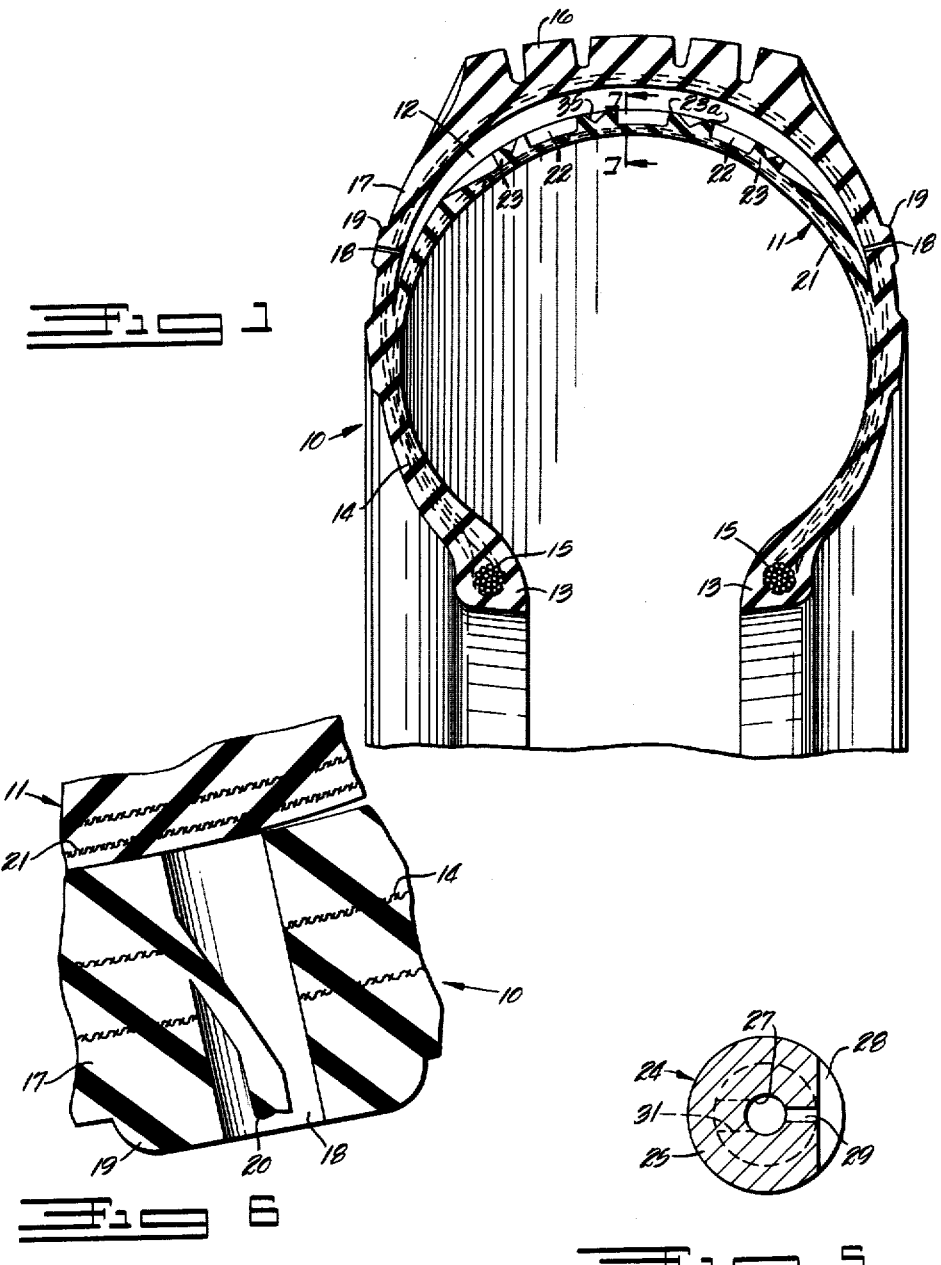

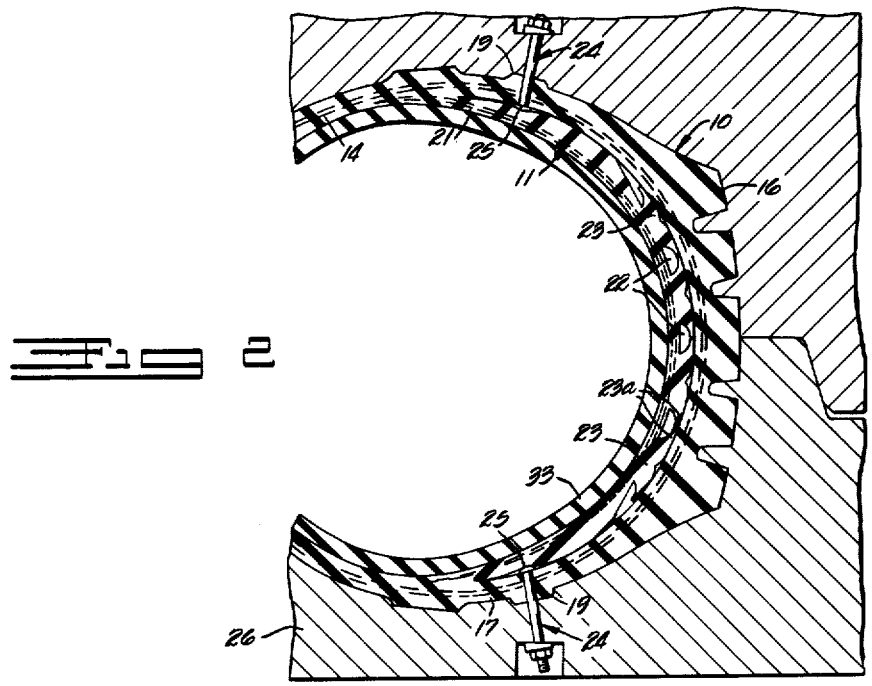
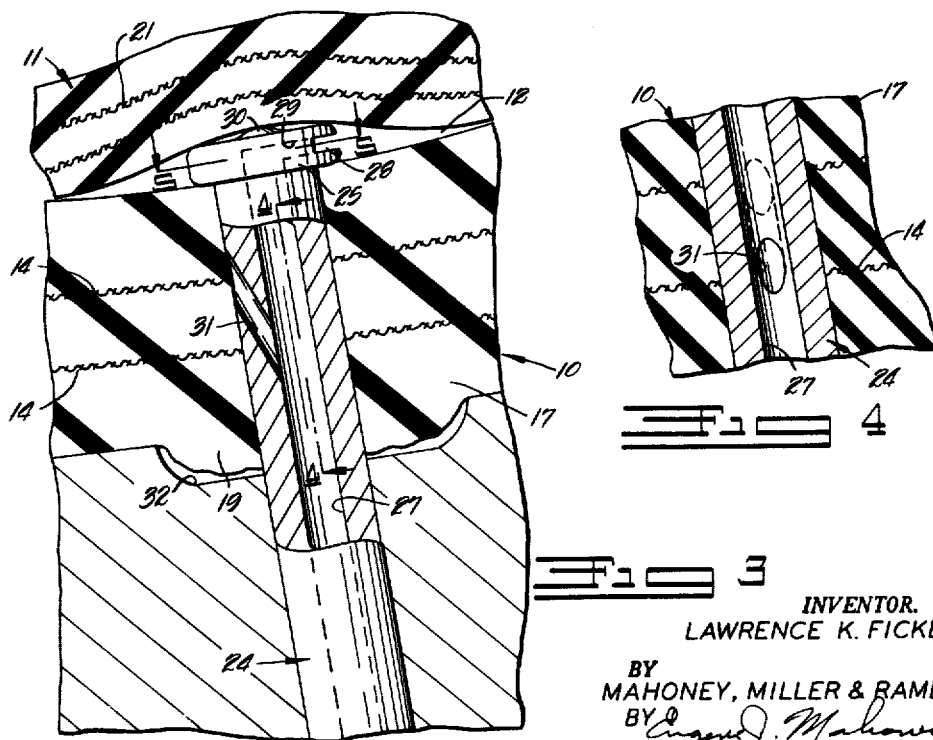

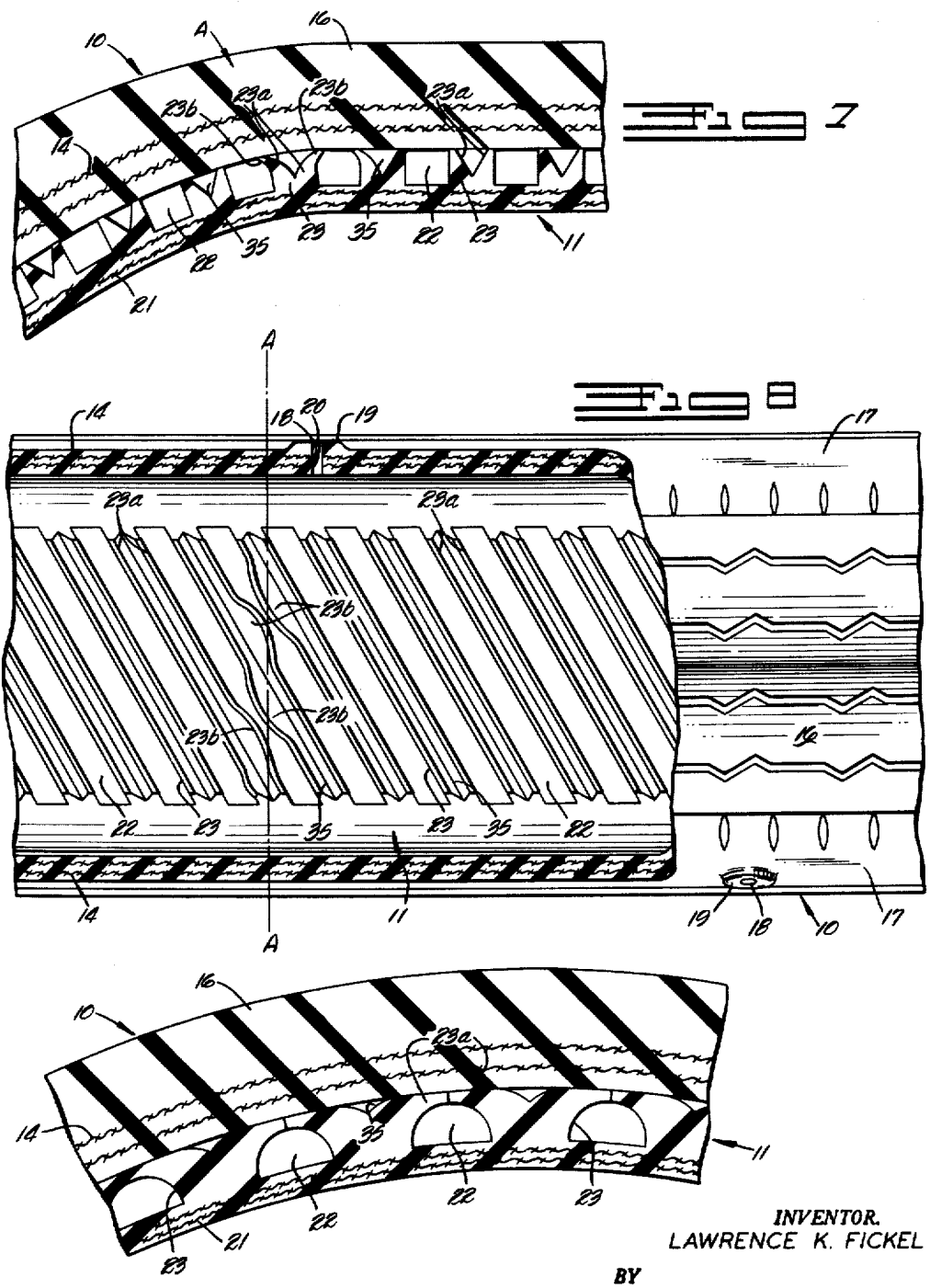

3,110,339
VENTILATED PNEUMATIC TIRE STRUCTURE
AND METHOD OF FABRICATING THE TIRE
Lawrence K. Fickel, 360 E. 2nd St., Logan, Ohio
Filed Jan. 2, 1962, Ser. No. 163,567
3 Claims. (Cl. 152—339)

This invention relates to a ventilated pneumatic tire structure and to a method of fabricating the tire.

The pneumatic tires currently utilized by land vehicles are subjected to extreme stress under high speed operation which often results in structural failure of the tire. One of the most frequent type of structural failures has been separation of the cords from the rubber which weakens the tire and results in a blowout. A major cause of structural failure through separation has been the increased forces and the large quantities of heat generated by the rapid flexing of the tire under prolonged high speed operating conditions. The tires heretofore developed to withstand the forces developed by high speed have been incapable of effectively dissipating the heat generated and the build-up of heat weakens the bond between the cords and the rubber. When the bond has been sufficiently weakened, separation will occur which often results in a blowout.

Another cause of structural failure through separation are the defects of manufacture resulting from entrapment of air within the tire casing which may prevent the formation of a strong bond between the cords and the rubber. In the construction of a tire, one or more sheets of cords are interposed between layers of rubber during the construction operations which usually results in a quantity of air being retained therebetween. This air must escape or be otherwise removed during the curing process to permit formation of a bond between the rubber and the cords. It is impossible to assure that all of the air will escape or be removed by the previous methods of manufacture and defects consisting of unbonded rubber and cord will often occur. The structural strength of the tire will be decreased at any point of separation and a blowout may result during operation.

It is, therefore, the primary object of this invention to provide a ventilated pneumatic tire that is capable of dissipating the large amount of heat generated through prolonged high speed operation.

It is another object of this invention to provide a pneumatic tire with an integrally formed ventilation chamber that automatically expels the heated air from the chamber to dissipate the heat generated by the tire through rolling contact with a ground plane.

It is a further object of this invention to provide a ventilated pneumatic tire having an inner liner forming an air chamber with the tire casing and having a plurality of ventilating apertures exteriorly communicating with the chamber formed in the tire casing.

It is also an object of this invention to provide a method for economically fabricating a ventilated pneumatic tire while retaining the structural strength and operating characteristics of unventilated tires.

Other objects and advantages of this invention will be readily apparent from the following detailed description thereof and the accompanying drawings in which:

FIG. 1 is a partial radial section of a pneumatic tire embodying the present invention;

FIG. 2 is a partial radial section of a pneumatic tire embodying the present invention disposed in a vulcanizing mold;

FIG. 3 is an enlarged detail of an aperture forming dowel, partially in section, positioned in the vulcanizing mold;

FIG. 4 is a longitudinal sectional detail of the dowel taken along line 4—4 of FIG. 3;

FIG. 5 is a transverse sectional detail of the dowel taken along line 5—5 of FIG. 3;

FIG. 6 is an enlarged sectional detail of the tire taken along a plane intersecting the longitudinal axis of one of the ventilating apertures;

FIG. 7 is an enlarged fragmentary sectional detail of the tire taken along line 7—7 of FIG. 1;

FIG. 8 is a partial plan view of the tire with a portion of the casing broken away; and FIG. 9 is a sectional schematic of a portion of a liner and casing showing the deformation of the channel-forming bars during the vulcanization process.

Referring to the drawings, particularly FIG. 1, a ventilated tire constructed in accordance with this invention comprises a tire casing 10 of substantially circular cross-section having a liner 11 forming an air chamber 12 therewith. The casing 10 includes a plurality of rubberized fabric plies terminating at their edges in two annular beads 13. Each of the plies includes at least one sheet of fabric cords 14 extending throughout the casing with the ends thereof wrapped about and anchored to an inextensible core member 15 embedded in each bead 13. A rubber tread 16 and side wall 17 are vulcanized to the external surface of the casing 10 forming a friction-contacting surface and protective sheath for the casing. Although the tire casing illustrated in the drawings is constructed with two plies and including two sheets of cords 14, it is to be understood that additional plies may be utilized as determined by specific design requirements.

Exteriorly communicating with the air chamber 12 are a plurality of apertures 18 formed in the casing 10. In the present embodiment of the invention, six apertures 18 uniformly spaced in an annular ring in each side wall portion of the casing have been found sufficient to provide adequate ventilation of the tire. The apertures 18 are located in the side wall of the casing a given distance downwardly from the tread for effective utilization of the air chamber although it is necessary to avoid placement of the apertures 18 so near the juncture of the liner 11 and the casing 10 that expansion of the liner, when inflated, will interfere with the relatively free movement of air through the apertures. Each aperture 18 is of cylindrical form and extends perpendicularly through the side wall of the tire. Coaxially aligned with each aperture 18 and integrally formed with the rubber side wall 17 is an annular boss 19 (FIG. 6) for increasing the strength of the side wall.

Disposed within each aperture 18 is a flexible member 20 (FIG. 6) which aids in preventing solid particles from entering the air chamber 12 through the apertures 18 that may be injurious to the tire or decrease the flow of air therethrough. The flexible members 20 are elongated rods of rubber, generally cylindrical in form, integrally formed with the casing 10. These flexible members are attached at one end to the walls of the apertures 18 and extend within the apertures toward the exterior of the tire. The flexible members 20 are disposed angularly relative to the wall of the apertures 18 terminating at the exterior of the tire casing. Normal rotation of the tire will cause a rapid fluctuation of the flexible members and thereby dislodge any solid particles that may have attempted to enter the apertures.

The liner 11 is also of substantially circular cross-section conforming generally to the interior surface of the casing 10. It is formed from substantially air-impervious rubberized fabric plies which include at least one sheet of fabric cords 21 extending throughout the liner to provide the necessary strength. In the present embodiment, the edges of the liner cords 21 are wrapped about and anchored to the core members 15 in each bead of the casing 10. The edge portions of the liner 11 are vulcanized to the side walls of the casing 10 forming an integral structure therewith. Vulcanization is only permitted to occur on that portion of the casing 10 extending upwardly from the beads 13 to approximately the midpoint of the side walls whereby the liner forms the inner arcuately curved wall of the air chamber 12. The portions of the liner and casing vulcanized together, however, may be varied to a greater or less extent in accordance with specific design requirements.

Although the liner 11 may be fabricated as a unitary assembly of rubberized fabric plies providing a smooth wall for the air chamber 12, it is preferable to construct the liner with a plurality of transverse channels 22 in the liner surface forming a wall of the air chamber, as shown in FIGS. 1, 7 and 8, to improve the circulation of air through the tire. The channels 22 are formed by vulcanizing a plurality of rubber bars 23 to the surface of the rubberized fabric plies of the liner 11 in a parallel, spaced relationship. Each bar 23 is substantially rectangular in cross-section with a V-shaped notch 35 formed in the outwardly facing surface of the bars. The notches 35 extend longitudinally of the bars 23 with the vertex thereof disposed at substantially the center of the bar forming pairs of outwardly diverging flexible leg members 23a. Diagonal orientation of the bars 23 (see FIG. 8) is preferred, not only for the improved air flow obtainable, but for the relatively smooth riding characteristics due to the overlapping of several bars at any particular radial section of the tire as it is brought into contact with the ground.

Mounting a tire constructed in accordance with this invention on a vehicle wheel and placing the liner 11 under pressure either by direct inflation or through an inner tube will cause the liner to distend slightly and force the bars 23 into contact with the inner wall of the casing 10. Although the internal pressure on the liner 11 is equal at all points, the weight of a vehicle supported by the tire will tend to flatten an area of the casing in contact with a ground plane, thereby forming a relatively sharp bend in the tire casing at both the leading and trailing edge of the flattened ground contacting area. The point where the sharp bend may occur is indicated by the letter A in FIG. 7 and by the line A—A in FIG. 8 which illustrate the effect of a bend in the casing on the bars 23. As the tire is rotated along the ground plane, the bars 23 successively encounter the sharp bend A where the tire casing 10 will deform the bars 23, as indicated in FIGS. 7 and 8, causing the flexible leg members 23a to project laterally toward an adjacent bar. As the bars 23 are diagonally disposed, only a portion of a bar will be deformed in this manner at any particular instant, and a small lobe 23b will be formed in a channel 22 between two adjacent bars 23 by each of the two opposed leg members 23a, thereby materially reducing the cross-sectional area of the channel 22 at this point. Continued rotation of the tire will cause the lobes 23b so formed to progress toward the trailing end of the bars, causing some of the air contained therein to be displaced from a channel and into the annular cavity formed at the juncture of the liner 11 and the casing 10 to which the apertures 18 open. The displaced air will increase the pressure in the cavity forcing some of the air therein outwardly through the apertures 18 located on that side of the tire. Simultaneously, the air pressure will be reduced in the annular cavity at the other side of the tire associated with the leading end of the bars whereby the atmospheric pressure will force a quantity of cool external air through the apertures 18 on this side of the tire. A recirculation of air within the tire also occurs as some of the displaced air in the cavity at the trailing ends of the bars may return to the other cavity through the channels 22 located at other portions of the tire not making or breaking contact with the ground. However, this recirculated air is not sufficient to prevent the desired exhausting of internally heated air and the intake of cool air.

The portion of the tire in contact with the ground plane does not produce any air circulation as the bars return to their normal rectangular shape. However, the air circulation process does occur also at the trailing edge of the ground-contacting area where another sharp bend is formed in the tire casing similar to that of the leading edge.

The apertures 18 are advantageously formed during the vulcanizing process to avoid reduction of the structural strength of the tire casing that may be occasioned by subsequently drilling or punching an aperture through the cords. For this purpose, dowels 24, shown in detail by FIGS. 3, 4 and 5, are utilized for forming the apertures 18 during vulcanization of the tire. Each dowel 24 consists of an elongated tubular body of cylindrical cross-section with a cylindrical head 25 of slightly larger diameter integrally formed at one end. The opposite end of the dowels 24 are inserted in sockets in the vulcanizing mold 26 which are disposed perpendicularly to the interior surface wall of the mold. Attachment of the dowels 24 to the mold may be by any suitable manner, such as a threaded connection. It is desirable that the dowels be detachably connected to the mold to facilitate interchanging of dowels having different lengths to accommodate tires constructed with various numbers of plies or various thicknesses of plies. The longitudinal bore 27 of each dowel opens at the end inserted in the mold 26 but terminates within the dowel head 25. Formed in the head 25 of each dowel (FIGS. 3 and 5) is an outwardly opening, transversely extending slot 28 of a width less than the thickness of the dowel head. A radially disposed hole 29 of a diameter substantially equal to the width of the slot 28 connects the slot with the bore 27 for communication with the exterior of the mold 26. The end of the head 25 is provided with a centrally disposed hemispherical boss 30 to facilitate insertion of the dowel 24 through the sheets of cords 14 in the tire casing 10. Before vulcanization, the soft rubber tire casing 10 is positioned in the mold and is forced outwardly against the dowels 24 which readily penetrate the soft rubber side wall 17 while the boss 30 separates the fabric cords 14 sufficiently for passage over the dowel head 25 without tearing. This finally positions the head 25 between the casing 10 and the liner 11 as shown in FIG. 3.

Extending diagonally through the tubular body of each dowel 24 in a longitudinal direction (FIG. 3) is a cylindrical passage 31 for forming the dirt-excluding flexible member 20. The passage 31, opening to the exterior surface of the dowel body at approximately the midpoint of the casing 10 is inclined inwardly toward the bore 27 and away from the head 25. Thus, while the tire is being vulcanized, a quantity of the rubber with which the plies are formed will flow inwardly through the passage 31 to the bore 27 and thence a distance through the bore toward the exterior of the mold.

Formation of the boss 19 is accomplished by a suitably shaped, annular recess 32 (FIG. 3) formed in the inner surface of the mold 26 positioned coaxially with the socket in which the dowel 24 is inserted. Additional unvulcanized rubber is utilized as necessary in constructing the rubber side wall 17 of the casing to form the boss 19. Application of heat and pressure during vulcanization will cause the rubber to flow into the recess 32 and produce a boss substantially conforming to the shape thereof.

In fabricating a ventilated tire without the passageways 22 which may or may not be used, the required number of dowels 24 are inserted in their respective sockets in the mold 26 to position the dowel head 25 a distance from the interior mold surface equal to the proposed thickness of the tire casing 10. A previously built-up tire, including a casing 10 and a liner 11 is then positioned in the mold. In constructing the tire, a vulcanadjacently disposed surfaces of the casing 10 and liner 11 where it is desired to prevent vulcanization. An expansible curing bag 33 (FIG. 2), with the exterior surface thereof coated with a vulcanizing inhibitor, is then placed in the interior of the liner and inflated. With a subsequent application of heat, the inflated curing bag 33 will force the liner 11 into contact with the casing 10 and, subsequently, the tread and side wall portions 16 and 17 into conformity with the interior surface of the mold. The dowels 24 will also penetrate the casing 10 to position the dowel heads 25 between the casing and liner 11. Therefore, air contained within the casing 10 and between the casing and liner 11 will be able to escape to the exterior of the mold 26 through the bore 27 and the passage 31 in the dowel 24. The thickness of the dowel heads 25 is sufficiently small to prevent any substantial penetration of the dowels into the liner 11. Obstruction of the slots 28 by rubber of the liner 11 is effectively prevented by the sheets of cords 21 in the liner 11 which maintain the liner in its previously constructed form.

After completion of the vulcanization process, the mold 26 may be readily removed from the tire as dowels 24 will pull through the casing. The resilient vulcanized rubber will stretch sufficiently to permit passage of the dowel heads 25 therethrough as well as removal of the flexible member 29 from the bore 27 and the passage 31.

Fabrication of a ventilated tire with a liner 11 having diagonally disposed channels 22 therein, as shown in FIGS. 7 and 8, is accomplished in a similar manner. The liner, however, is preferably partially prefabricated and vulcanized before incorporation with a tire casing as illustrated in FIG. 7. A plurality of elongated bars of rubber 23 of rectangular cross-section are first vulcanized to the surface of the rubberized fabric plies of the liner in a parallel spaced relationship. Each of the bars 23 is formed with a longitudinally extending notch 35 of V-form disposed in the outwardly facing surface thereof. A tire is then built up utilizing the prefabricated liner and positioned in a mold where the pressure exerted by the air bag 33 will distend the liner 11, forcing the rubberized plies of the liner and bars 23 into contact with the casing 10 and subsequently forcing the casing into contact with the mold 26. The flexible leg members 23a of each bar, however, will deform substantially as indicated in FIG. 9 over their entire length, bridging over the channel 22 between two adjacent bars 23. The deformed bars 23 will present a substantially continuous surface and thereby apply a uniform pressure to the interior surface of the casing 10. Although the ends of the opposed legs 23a of any two adjacent bars 23 may be in a contacting relationship during the vulcanizing process, they will not vulcanize together as the vulcanizing inhibiting coating applied to the interior surface of the casing will also be on the ends of each of the bars 23. After the curing pressure has been relieved from the air bag 33, the liner 11 will retract to its normal position, permitting the bars 23 to return to their rectangular shape.

It is apparent from the detailed description of this invention that a ventilated pneumatic tire is provided which is capable of effectively dissipating the large quantities of heat generated during prolonged high speed operation. A tire constructed in accordance with this invention also has a structural strength favorably comparable with that of the normal unventilated tires. Defective construction due to entrapment of air within the rubberized plies during vulcanization is substantially eliminated as the aperture-forming dowels readily permit the removal of the air. Tire failure as a consequence of cord separation is therefore materially reduced. The method of constructing a ventilated tire provided by this invention is simple and economical. Only a slight modification of previously utilized vulcanizing molds is necessary for attachment of the aperture-forming dowels.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

What is claimed is:

1. A vulcanized pneumatic tire of substantially circular cross-section comprising a body portion formed from a plurality of rubberized plies terminating at their edges in two annular beads, said plies including at least one sheet of cords with the ends thereof wrapped about and anchored to inextensible core members embedded in each bead, said body portion having superimposed thereon a vulcanized rubber tread portion, and a substantially air impervious vulcanized rubber liner adhered at its ends to the inner surface of said body portion a distance radially outward from said beads forming an air chamber with said body portion, said body portion being provided with a plurality of exteriorly communicating apertures connecting with the air chamber for the passage of air through said air chamber, each of said apertures having an elongated vulcanized rubber member substantially smaller than the aperture adhered at one end to the aperture wall, said member being angularly disposed to said aperture wall and terminating in a free end adjacent the exterior end of said aperture.

2. A vulcanized pneumatic tire of substantially circular cross-section comprising a body portion formed from a plurality of rubberized plies terminating at their edges in two annular beads, said plies including at least one sheet of cords with the ends thereof wrapped about and anchored to inextensible core members embedded in each bead, said body portion having superimposed thereon a vulcanized rubber tread portion, and a substantially air impervious vulcanized rubber liner adhered at its ends to the inner surface of said body portion a distance from said beads forming an air chamber with said body portion, said liner having a plurality of elongated, flexible rubber bars of substantially rectangular cross-section adhered to the surface thereof within said air chamber in a diagonally disposed, parallel, spaced relationship forming channels for the passage of air through said air chamber, each of said bars being provided with an outwardly opening, longitudinally extending notch of a substantially V-form in the outwardly facing surface thereof permitting the portions of a bar forming the sides of said notch to diverge laterally outward therefrom toward adjacent bars when said casing is forced against said bar to reduce the volume of the channels formed therebetween for moving the air within said channels through said air chamber, said body portion being provided with a plurality of exteriorly communicating apertures connecting to the air chamber for the passage of air into and from said air chamber.

3. A vulcanized pneumatic tire according to claim 1 wherein said apertures are provided with an elongated, cylindrical member substantially smaller in diameter than the aperture, said member being fabricated from rubber material vulcanized at one end to the wall of said aperture and disposed angularly thereto extending outwardly through said aperture terminating adjacent the exterior of the casing for preventing the passage of foreign material inwardly therethrough.

References Cited in the file of this patent

UNITED STATES PATENTS

| | | |
|---|---|---|
| 1,389,442 | De Mattia | Aug. 30, 1921 |
| 2,031,560 | Day | Feb. 18, 1936 |
| 2,047,858 | Day | July 14, 1936 |
| 2,770,282 | Herzegh | Nov. 13, 1956 |
| 3,034,558 | Steer et al. | May 15, 1962 |
| 3,062,256 | La Porte | Nov. 6, 1962 |
| 3,087,528 | Hindlin et al. | Apr. 30, 1963 |

UNITED STATES PATENT OFFICE

CERTIFICATE OF CORRECTION

Patent No. 3,110,339                    November 12, 1963

Lawrence K. Fickel

It is hereby certified that error appears in the above numbered patent requiring correction and that the said Letters Patent should read as corrected below.

Column 5, line 10, for "casting" read -- casing --; column 6, line 56, for the claim reference numeral "1" read -- 2 --.

Signed and sealed this 28th day of April 1964.

(SEAL)
Attest:
ERNEST W. SWIDER

Attesting Officer

EDWARD J. BRENNER
Commissioner of Patents